United States Patent [19]

Momose et al.

[11] Patent Number: 5,127,745
[45] Date of Patent: Jul. 7, 1992

[54] CERAMIC BEARING

[75] Inventors: Terunobu Momose; Tetsuo Shibata, both of Mizunami, Japan

[73] Assignee: Wing Highcera Co., Ltd., Japan

[21] Appl. No.: 593,797

[22] Filed: Oct. 5, 1990

[30] Foreign Application Priority Data

Oct. 12, 1989 [JP] Japan .................................. 1-263909

[51] Int. Cl.⁵ .............................................. F16C 33/04
[52] U.S. Cl. ................................. 384/276; 384/275; 384/907.1
[58] Field of Search ............... 384/129, 226, 227, 243, 384/244, 275, 276, 295–297, 420, 425, 907, 907.1, 908, 913

[56] References Cited

U.S. PATENT DOCUMENTS

| | | | |
|---|---|---|---|
| 3,071,419 | 1/1963 | Lower et al. | 384/295 |
| 3,578,828 | 5/1971 | Orkin et al. | 384/129 |
| 3,726,572 | 4/1973 | Beardmore | 384/913 X |
| 4,477,197 | 10/1984 | Choate | 384/297 X |

FOREIGN PATENT DOCUMENTS

| | | | |
|---|---|---|---|
| 732724 | 3/1943 | Fed. Rep. of Germany | 384/420 |
| 425749 | 8/1948 | Italy | 384/192 |
| 93620 | 4/1989 | Japan | 384/907.1 |
| 281535 | 6/1952 | Switzerland | 384/129 |
| 567905 | 3/1945 | United Kingdom | 384/297 |
| 704035 | 2/1954 | United Kingdom | 384/276 |

*Primary Examiner*—Thomas R. Hannon
*Attorney, Agent, or Firm*—Eckert Seamans Cherin & Mellott

[57] ABSTRACT

The ceramic bearing constructed by being allowed to contact the ceramic outer ring slidably with the ceramic inner ring is provided with a latching member to prevent the transfer of the ceramic inner ring in the axial direction at the inner or the outer ring of said ceramic product.

The bearing constructed by the sliding contact of the ceramic inner ring with the ceramic outer ring can prevent the occurrence of the transfer of the inner ring in the axial direction with respect to the outer ring by providing a latching member which prevents the transfer of the inner ring in the axial direction at the inner or outer ring. Accordingly, there is no anxiety of separation of the outer ring from the inner ring.

3 Claims, 3 Drawing Sheets

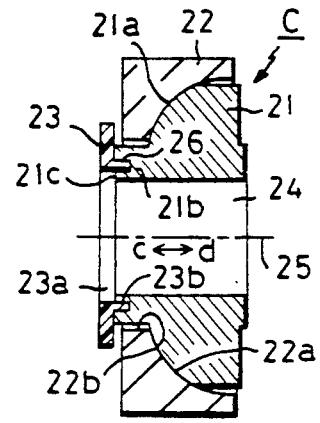
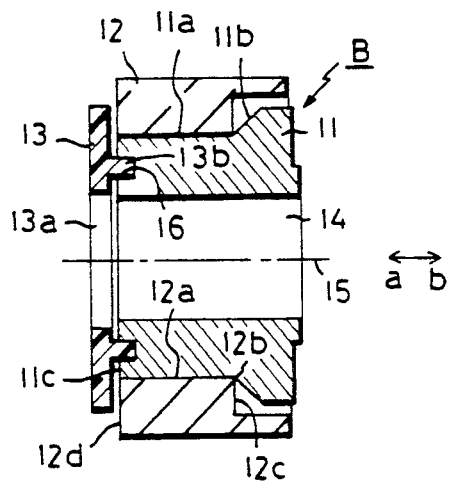
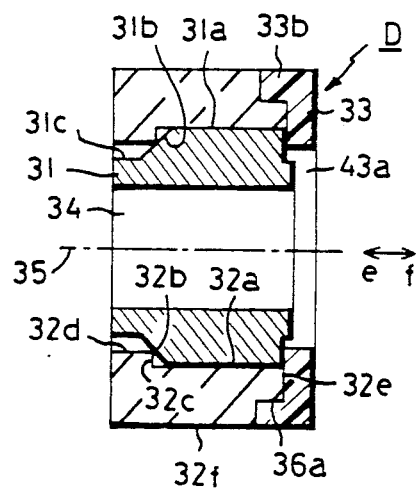

CERAMIC BEARING

FIELD OF THE INVENTION

This invention relates to a ceramic bearing constructed by combining a ceramic inner ring and a ceramic outer ring, particularly to a ceramic bearing wherein the ceramics inner ring prevents movement of the ceramics outer ring in an axial direction.

DESCRIPTION OF THE PRIOR ART

It is generally performed to use a sliding bearing or a rolling bearing in a case of attaching an axis of rotation to a machine frame.

As a rolling bearing, such kinds of a ball bearing, a roller bearing and a needle bearing having a rotary member such as balls, rollers and needles is situated between the inner ring and the outer ring. Further, there exist bearings such as radial bearings, thrust bearing and like according to a supporting system of a load which acts on an axis engaged with the inner ring. A deep-groove type bearing, an angular type bearing, and a taper roller bearing and etc. are known as the bearing enabling to support the shaft to which a radial load and a thrust load are simultaneously applied. These many rolling bearings are standardized. Accordingly, on designing a machine, the most suitable one is selected and employed.

The above sliding bearings are made or constructed of a metal supporter made of steel, cast iron, copper and the like laminated a white metal layer thereon or laminated an oil including alloy or embed it thereon. Further, some sliding bearings are made or constructed by gun metal, synthetic resin and the like formed to a sleeve shape.

Generally, in conventional sliding bearings, a bearing which supports a radial load and a bearing which supports a thrust load are separately standardized.

The above rolling bearing and the sliding bearing have peculiar characteristics respectively. Accordingly,. in employment the most suitable one is used considering these characteristics.

However, even the above rolling bearings and the sliding bearings have troubles.

Namely, in the rolling bearing flaking phenomenon due to rolling fatigues is happened which determines its life necessarily. By this, because the thermal resistance is low and the number of constructing parts thereof increases, the cost of the product becomes high. Further, in the above sliding bearing the friction loss increases due to the sliding contact of the outer periphery of the axis with the inner periphery, By this, there occurs such problem as necessity of applying a reinforced lubrication or a self lubrication to the contact surface of the axis with the bearing.

On the other hand, ceramics having high compressive strength, friction resistance and small friction coefficient, have been developed recently.

Further, a prior art disclosed in U.S. Pat. No. 4,634,300 relates to a rolling bearing constructed by using a ceramic roller as a rolling body. According to this technique, it is possible to constitute a rolling bearing having a heat resistance and an anti-corrosion, but number of parts products which constitute the bearing increases.

In order to solve the above problems, the applicant of this invention has developed many kinds of ceramic bearings and submitted patent applications (Japanese Patent Application No. 63-325933 etc.).

SUMMARY OF THE INVENTION

The main object of this invention is to provide a ceramic bearing to solve the above problems, particularly a ceramic bearing constructed by the sliding contact of the inner ring of ceramic product with the outer ring of ceramic product, said ceramic bearing being able to prevent to move the inner ring of the ceramic product in an axial direction with respect to the outer ring of the ceramic product.

Another object of this invention is to provide a bearing having small numbers of parts by constructing the inner and outer rings by means of ceramics.

Accordingly, in order to attain these objects the ceramic product of this invention is characterized in that the ceramic bearing constructed by being allowed to contact the ceramic outer ring slidably with the ceramic inner ring is provided with a latching member to prevent the transfer of the ceramic inner ring in the axial direction at the inner or the outer ring of said ceramic product.

As described in this invention, the bearing constructed by the sliding contact of the ceramic inner ring (hereafter referred to as "inner ring") with the ceramic outer ring (hereafter referred to as "outer ring") can prevent the occurrence of the transfer of the inner ring in the axial direction with respect to the outer ring by providing a latching member which prevents the transfer of the inner ring in the axial direction at the inner or outer ring. Accordingly, there is no anxiety of separation of the outer ring from the inner ring.

Further, since the bearing is constructed by outer and inner rings, number of parts decreases as compared with the conventional rolling bearing, thereby being able to decrease its cost.

Since the axis is engaged with an axial hole formed at the inner ring, the sliding does not happen between the axis and the inner ring. Accordingly, there is no anxiety of the occurrence of the wear at the axis even after long period of use.

Furthermore, a sliding friction is very low due to the construction made of the inner and outer ceramic rings. By this, the thermal generation due to the friction can be lowered. Since the expansion due to the heat is low, the occurrence of stress to a machine frame or the axis is possible to be lower.

BRIEF DESCRIPTION OF THE DRAWINGS

FIG. 4 is an assembling explanatory view in a second embodiment of this invention.

FIG. 5 is an assembling explanatory view in a third embodiment of this invention.

FIG. 6 is an assembling explanatory view in a fourth embodiment of this invention.

DETAILED DESCRIPTION OF THE PREFERRED EMBODIMENT

[EXAMPLE 1]

Figure 1:
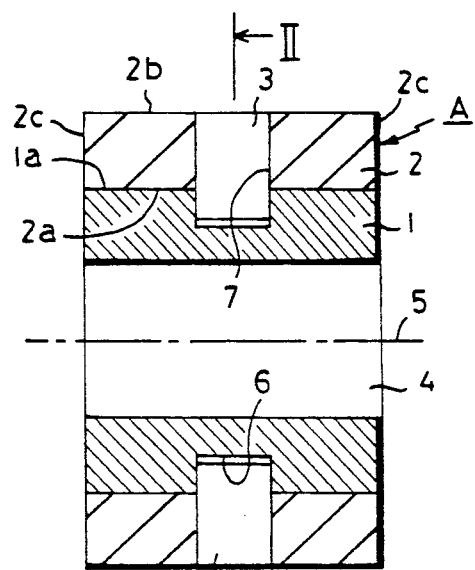
FIG. 1 is an assembling explanatory view of the bearing in a first embodiment of this invention.
Figure 2:
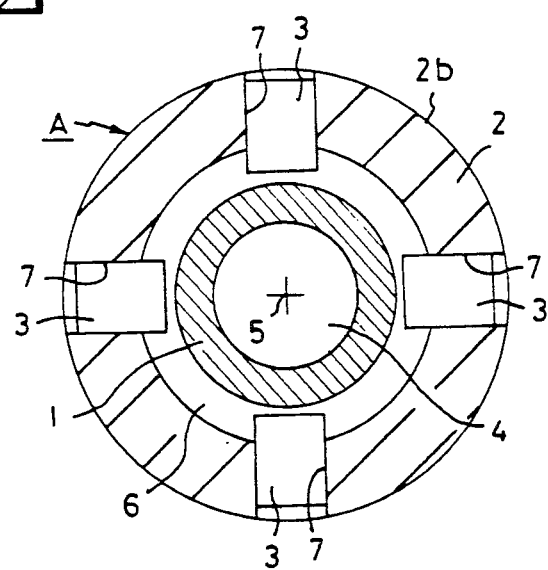
FIG. 2 is a sectional explanatory view along the line II—II of FIG. 1.

In FIG. 1 to FIG. 3, the bearing A comprises an inner ring 1 to be engaged with the axis, an outer ring 2 to be attached to a machine frame or a casing and a plurality of guide pins 3 fit to the outer ring 2.

The inner ring 1 is formed by press-forming an oxide ceramics material of a material such as PSZ (partially stabilized Zirconia) or alumina, etc. by filling it in a mold and then sintering a molded product at 1500° C. to 1600° C. An axial hole 4 for engaging the axis is formed at the center of the inner ring 1. The axial hole is formed so as to have a fixed engaging allowance according to a diameter of the axis to be engaged with the axial hole 4.

The numeral 5 is an axial center of the axial hole and corresponds to the axial center of the bearing A.

A sliding surface 1a is formed on the outer periphery of the inner ring 1 in parallel to the axial center 5. The sliding surface 1a transmits a radial load applied on the axis to the outer ring 2 by the sliding contact with the sliding surface 2a formed at the outer ring 2 described hereinafter. For this purpose, the sliding surface 1a is necessary to be parallel to the axial center 5 correctly.

At the approximately middle portion of the sliding surface 1a formed on the outer periphery of the inner ring 1, a ring shape groove 6 is formed all around the inner ring 1. The groove 6 constrains the moving direction of the inner ring 1 only in a rotational direction by latching with guide pin 3.

The outer ring 2 is also formed by press-forming filling an oxide ceramics material such as PSZ or alumina etc. in a mold as same as in the inner ring 1 and then sintering it at 1500 C. to 1600 C.

At the inner of the outer ring 2, a sliding surface 2a formed so as to have a fixed allowance with respect to the sliding surface 1a formed on the outer periphery of the inner ring 1 is formed. The sliding surface 2a is formed so as to have an approximately equivalent length to the sliding surface 1a of the inner ring and contacts with the sliding surface 1a slidably whereby a radial load applied on the axis is transmitted through the inner ring 1. For this purpose, the sliding surface 2a is constructed by a parallel surface to the axial center 5.

A plurality of holes 7 for engaging guide pins 3 are formed at approximately middle portion in the axial direction of the outer ring 2 and positions corresponding to the groove 6 formed at the inner ring 1. The shape of the hole 7 is that of the guide pin 3, namely a circular shape or a polygon and the dimension thereof is formed to be approximately equivalent to that of the guide pin 3.

The outer periphery 2b of the outer ring 2 is formed to be cylindrical shape parallel to the axial center 5. The both end surfaces 2c of the outer ring 2 is constructed as a rectangular plane against the axial center 5. The outer periphery 2b and the end surface 2c become engaged portions when they are attached to a machine frame or a casing not illustrats the bearing A.

The guide pin 3 is formed by press-forming an oxide ceramics material such as PSZ and alumina etc. filling it in a mold and sintering a molded product thereof at approximately 1500° C. to 1600° C.

Figure 3A:
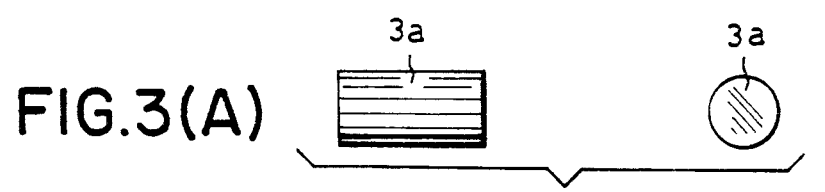
FIG. 3a-3c are explanatory views of a guide pin in the first embodiment.
Figure 3B:
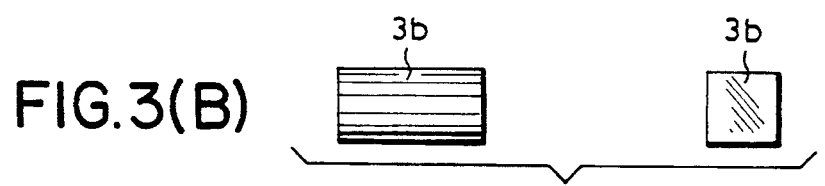
Figure 3C:
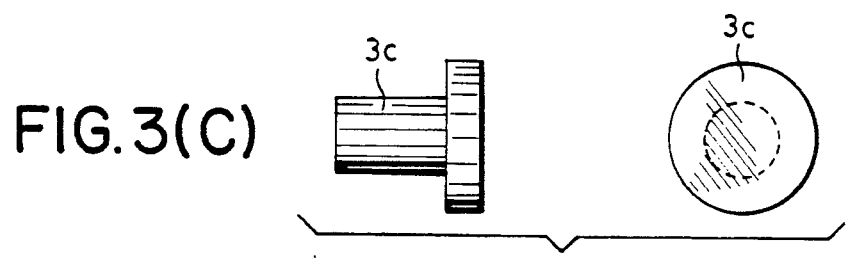

The guide pin 3 may be so called a straight pin or a taper pin. Further, a shape of guide pin 3 (3a to 3c) may be a cylindrical pin 3a as shown in FIG. 3(A) or may be a square pin 3b as shown in FIG. 3(B). Further, a pin 3c having a flange at the end portion as shown in FIG. 3(C) may be used. In this embodiment, the cylindrical pin 3a is used as guide pin 3.

The guide pin 3 is formed to be equal to the wide dimension of the groove to formed at the inner ring 1 or to somewhat small dimension thereof. Accordingly, there is no anxiety of occurrence of play between the guide pin 3 and groove 6.

Further, number of guide pin 3 is desirable to be 3 or more than 3. This is due to the fact when number of guide pin is few and a load in a thrust direction applies on the axis of the inner ring 1, there is anxiety that a bending stress applies to the guide pin 3 due to said load.

The axial hole 4, the sliding surface 1a, the groove 4 in the inner ring 1 and the sliding surface 2a, the outer periphery 2b, the end surface 2a and the hole 7 etc. in the outer ring 2a are formed simultaneously when the inner and outer rings are press-formed.

In the above press forming, the dimension accuracies of the inner ring 1 and the outer ring 2 are possible to obtain approximately ±0.005 mm in accuracy against designed dimension of each part. Further, surface roughness can be secured about RA 0.8.

In order to construct the bearing A using the inner ring 1, outer ring 2 and guide pin 3 constructed as shown in the above, the sliding surface 2a is allowed to contact with the sliding surface 1a slidably by engaging the inner ring 1 with the outer ring 2. The groove 6 formed at the inner ring 1 is opposed to the hole 7 formed at the outer ring 2 and the guide pin 3 is inserted into each hole 7, top end of said guide pin 3 being allowed to latch with groove 6.

At this time, the guide pin 3 can be adapted to fix to the outer ring 2 by applying an adhesive to the corresponding part with the hole 7 of the guide pin 3 and engaging said pin 3 with hole 7. Further, the guide pin 3 can be adapted to fix to the outer ring 2 by expanding the hole 7 heating the outer ring 2 and engaging the guide pin 3 in normal temperature state to the hole 7, so called thermal insert. Furthermore, the guide pin 3 can be adapted to fix to the outer ring 2 by cooling the guide pin 3 to shrink by means of cold agent such as liquide nitrogen etc. and engaging said pin 3 to the outer ring 2 in normal state, so called cooling insert.

It is desirable to perform a grinding processing to the sliding surface 1a, the groove 6 of the inner ring 1, and the sliding surface 2a and the pin 3 of the outer ring 2 separately which constitutes the bearing A according to the accuracy requested for said bearing A.

Further, the lapping of the contact surface of the sliding surface 2a with the sliding surface 1a, the guide pin 3 and the groove 6 are also possible after engaging the inner ring 1 to the outer ring 2. The lapping can be practised by giving an abrasive agent such as diamond powders, etc. to each contact surface and a relative rotation thereto.

The rotation of the bearing A becomes to be smooth by grinding the inner and outer rings and guide pin 3 and groove 6 respectively or lapping them.

In the bearing A constructed as described above, the top end portion of the guide pin 3 fixed to the outer ring 2 is inserted into the groove 6 formed at the inner ring 1. By this, the inner ring 1 is constrained so as only to perform a rotary movemenr against the outer ring 2. Namely, the inner ring 1 is constrained to transfer in the axial direction with respect to the outer ring 2. Accordingly, when the outer ring 2 is, for instance, attached to a machine frame not illustrated herein and the axis is inserted into the axial hole 4 of the inner ring 1, the axis does not transfer in the axial direction with respect to the machine frame.

In the bearing A of this embodiment, the transferring of the inner ring 1 in the axial direction with respect to the outer ring 2 can be prevented.

[EXAMPLE 2]

In FIG. 4, the bearing B is constructed by combination of the ceramic inner ring 11, and outer ring 12 and the latching member 13.

At the center of the inner ring 11, the axial hole 14 for inserting an axis not illustrated is formed corresponding to the axial center 15 of the bearing. On the outer periphery of the inner ring 11, the sliding surface 11a parallel to the axial center 15 is formed and taper surface 11b is formed connecting with said sliding surface 11a.

At the end surface 11c of the front side (left side in FIG. 4, and so forth) of the inner ring 11, is formed a ring shape groove 16 having a center corresponds to the axial center 15 as shown in Figure. The groove 16 engages with a projection 13b formed at the latching member 13.

At the inner of the outer ring 12, the sliding surface 12a corresponds to the sliding surface 11a is formed and a plane 12c which is approximately right angle with the axial center 15 is formed connecting with the sliding surface 12a. At a ridged line formed by the sliding surface 12a and the plane 12c, a very small taper surface formed at a taper angle equivalent to the taper surface 11b of the inner ring 11 is constructed, said taper surface being constructed as the sliding member 12b. The sliding portion 12b contacts slidably with the taper surface 11b formed at the inner ring 11 and supports a load in the thrust direction applied on the axis engaged with the inner ring 11. Further, the end surface 12d at the front end side of the outer ring 12 is constructed as a right angle surface with the axial center 15.

At the latching member 13, is formed a hole 13 at the center having a larger diameter than that of axial hole 14 formed at the inner ring 11. Further, the outer diameter of the latching member 13 is formed to be larger than that of the sliding surface 11a of the inner ring 11 and smaller than that of the outer diameter of the outer ring 12. Furthermore, at one surface of the latching member 13, is formed a ring shape projection 13b engaged with the groove 16 formed at the inner ring 11.

In order to construct the bearing B by the inner ring 11, the outer ring 12 and the latching member 13 constructed as above, the inner ring 11 is engaged with the outer ring 12 to allow to contact the sliding surfaces 12a, 11a and the taper surface 11b with the sliding portion 12b slidably, and then the projection 13b of the latching member 13 is allowed to engage with the groove 16 formed at the inner ring 11. After that, the latching member 13 is fixed to the inner ring 11 by means of applying an adhesive agent, thermal insertion, or cooling insertion to the projection 13b.

In the bearing B thus constructed as described above, the sliding surface 11a formed at the inner ring contacts slidably with the sliding surface 12a formed at the outer ring 12 thereby being able to support the load in the radial direction applied to the axis engaged with the inner ring 11. Further, the taper surface 11b formed at the inner ring 11 contacts slidably with the sliding portion 12b formed at the outer ring 12 thereby being able to support the load in the thrust direction applied to the axis.

Thus in the bearing B, the taper surface 11b of the inner ring 11 contacts slidably with the sliding portion 12b of the outer ring 12 thereby preventing the transference of the inner ring 11 in a direction shown by the arrow. Since the latching member 13 fixed to the end surface 11c of the inner ring 11 has a larger diameter than that of the sliding surface 11a, the transference of the inner ring 11 in b direction shown by the arrow can be prevented.

In FIG. 5, the bearing C is constructed by the inner ring 21, the outer ring 22 and the latching member 23. The inner ring 21, the outer ring 22 and the latching member 23 are formed by forming the ceramics material and sintering as same as in each embodiment described above.

At the center of the inner ring 21, the axial hole 24 for engaging the axis not illustrated is formed corresponding to the axial center 25 of the bearing C.

The outer shape of the inner ring 21 is formed to be a curved surface shape, said curved surface being constructed as a sliding surface 21a. At the front side of the inner ring 21 a cylindrical boss portion 21b formed connecting with the sliding surface 21a, at the end surface 21c of said boss portion 21b being formed a ring shape groove 26 so that the center thereof may be corresponded to axial center 25.

The inner periphery of the outer ring 22 is formed with a shape corresponds to the shape of the sliding surface 21a formed at the inner ring 21, said inner periphery surface being constructed as a sliding surface 22a. Further, a hole 22b is formed continuing with the sliding surface 22a. The hole 22b is formed so as to have a comparstively larger dimension than that of the outer diameter of the boss portion 21b formed at the inner ring 21.

The latching member 23 is formed with approximately same shape with said latching member 13. Namely, at the latching member 23, a hole 32a is provided with a larger dimension than that of a diameter of the axial hole 24 formed at the inner ring 21 corresponding to the axial center 25 of the bearing C. Further, formed is a projection 23b having a center corresponds to the axial center 25.

In order to constitute the bearing C by the inner ring 21, outer ring 22 and latching member 23 constructed as described above, the inner ring 21 is engaged with the outer ring 22, the sliding surface 21a is allowed to contact slidably with the sliding surface 22a and then the projection 23b of the latching member 23 is allowed to engage with groove 26 formed at the end surface 21c of the inner ring 21. The latching member 23 is fixed to the inner ring 21 by means of applying an adhesive agent to the projection 23 or thermal or cooling insertion, etc.

In the bearing C thus constructed, even when the load in radial direction and the load in thrust direction applied simultaneously to the axis engaged with inner ring 21 by the sliding contact of the sliding surface 21a with the sliding surface 22a, said axis can be supported smoothly. Since the sliding surfaces 21a and 22a of the bearing C are formed to be a curved surface shape, the bearing C possesses an automatic adjustment function.

The bearing C is possible to prevent the trnsfer of the inner ring 21 in c direction shown by the arrow by the contact of sliding surfaces 21a, 22a and further to prevent its trnsfer in d direction shown by the arrow.

In FIG. 6, the axis D is constructed by a cap-like latching member 33. Said inner ring 31, the outer ring 32 and the latching member 33 are formed by forming ceramics material and sintering it as same as in each embodiment described above.

At the center of the inner ring 31, an axial hole 34 for engaging an axis not illustrated therein is formed corresponding to the axial center 35 of the bearing D. At the outer periphery of the inner ring 31, a sliding surface 31a parallel to the axial center 35 is formed, said sliding surface 31a forming a taper surface 31b connecting therewith at the front side of the inner ring 31. Further, the cylindrical surface 31c is formed continuing with said taper surface 31b.

At the inner periphery of the outer ring 32, is formed the sliding surface 32a which contacts slidably with the sliding surface 31a formed at the inner ring 31. At the front side of the sliding surface 32a, the surface 32c approximately rectangular to the axial center 35 and a cylindrical surface 32d having a smaller diameter than that of the sliding surface 32a parallel to the axial center 35 are formed. The surface 32d is formed with a compactively larger dimension than that of the outer diameter of the cylindrical surface 31c formed at the inner ring 31. To the ridged line constucted by the surfaces 32c and 32d is provided a sliding portion 32b which supports the load in the thrust direction applied to the inner ring by abutting the taper surface 31b formed at the inner ring 31 as same as in the second embodiment.

At the surface 32e of the rear side of the outer ring 32, a step portion 36a continued to the outer periphery 32f of the outer ring 32 is formed. The step portion 36a is formed to be a ring shape corresponds to the axial center 35 as its center.

The latching member 33 is formed so that the outer diameter may be approximately equivalent to the outer diameter of the outer ring 32 or a somewhat smaller diameter, and a ring shape projection 33b having a center corresponding to the axial center 35 is formed. The height of the projection 33b is formed so as to be approximately equivalent to the depth of the step 36a. Further, the numeral 33a is a hole formed to be a larger diameter than that of the axial hole 34.

In order to construct the bearing D by the inner and outer rings 31 and 32 respectively and the latching member 33, after engaging the inner ring with the outer ring 32, the latching member 33 is fixed to the outer ring 32 by applying the adhesive agent to the outer ring 32 or thermal insertion or cooling insertion of the outer ring 32 as same in the embodiment describe above.

In the above bearing D, since the outer periphery of the latching member 33 does not project more than outer ring 32, an attaching working of the bearing D to the machine frame, etc. can be performed smoothly using the outer periphery 32f of the outer ring 32 as a guide. Further, by sliding contact of the sliding surface 31a with the sliding surface 32a, the load in the radial direction applied to the axis engaged with the inner ring 31 is supported and by the sliding contact of the taper surface 31b with the sliding portion 32b, the load in the thrust direction can be supported.

The above bearing D prevents the transfer of the inner ring 31 in e direction shown by the arrow by the abutment of the taper surface 31b against the sliding portion 32b and prevents the transfer of the inner ring 31 in f direction shown by the arrow by the latching member fixed to be the outer ring 32.

As described above, by forming a step portion 36a having a same function as the groove in each above embodiment at the connecting portion of the outer periphery 32f and the rear end surface 32e of the outer ring 32, the form of the outer ring 32 become easy.

In each above bearing A to D, since the inner and outer rings are made by ceramics respectively, The friction coefficient becomes small thereby decreasing the friction loss thereof. By this, there is no need of the lubrication against the sliding surface. Further, even when the heat is generated due to the sliding, there occurs no excess of the thermal stress due to the thermal expansion of the inner and outer rings because the coefficient of the thermal expansion is about 8 to $11 \times 10^{-6}$ /°C. Further, since the heat temperature resistance of the ceramics is about 600° C. to 1000° C., there is no fear of deterioration of the inner and outer rings due to the heat generation.

What is claimed is:

1. A ceramic bearing, comprising:
   a ceramic inner ring defining an axis, an internal bore dimensioned for an interference fit on a rotatable shaft, and an outer sliding surface;
   a coaxial ceramic outer ring defining an inner sliding surface dimesioned for sliding contact with the outer sliding surface of the ceramic inner ring; and,
   latching means for preventing movement in at least one axial direction of the ceramic inner ring with respect to the ceramic outer ring.

2. The ceramic bearing according to claim 1, wherein a circumferential groove is defined in the outer sliding surface of the ceramic inner ring, the ceramic outer ring defines a hole extending from an outer peripheral surface to the inner sliding surface, said hole being axially aligned with said goorve, and the latching means comprises a ceramic pin fixed in said hole and extending into said groove.

3. The ceramic bearing according to claim 1, wherein one of the ceramic inner ring and the ceramic outer ring defines an end face having an annular groove, and the latching means comprises a ceramic plate member having an annular protrusion fixedly engaged in the annular groove.

* * * * *